United States Patent Office 3,312,828
Patented Apr. 4, 1967

3,312,828
ANALOG TO DIGITAL ENCODING APPARATUS FOR DIRECTLY READING OUT INFORMATION
Sidney A. Wingate, Concord, Mass., assignor to Wayne-George Corporation, Newton, Mass., a corporation of Massachusetts
Filed May 9, 1963, Ser. No. 279,071
20 Claims. (Cl. 250—231)

The present application is a continuation-in-part of U.S. patent application Ser. No. 249,286, filed on Jan. 3, 1963 in the name of Sidney A. Wingate for Shaft Angle Encoding, now Patent No. 3,265,902, all of the disclosure of which is incorporated herein by reference.

The present invention relates to analog to digital encoding by which digital information is generated as a function of mechanical relationship and, more particularly, to the determination of extremely precise information in regard to shaft angularity by a so-called direct reading encoder. In a typical direct reading encoder, angular position is determined in conjunction with a coded component (e.g. a disk) that is provided about its periphery with a series of concentric tracks, each having alternate increments (e.g. opaque and clear), which alternately actuate (e.g. direct radiation toward and obscure radiation from) a bank of suitable sensing components (e.g. photoelectric transducers). Reading, in effect, involves sensing a selected grouping of coded increments that extends from track to track (e.g. along a stationary radial line relative to the rotatable disk). One limitation to angular resolution is the width of the increments along a particular code track, in other words, total number of increments physically specified (as by light available and structural limitations) in the code track. However, greater resolution than is so specified may be desired.

It has been found that angular displacement of an encoder of the foregoing type may be designed to cause a sensing component associated with one of its tracks to produce an output signal that, as a practical matter, is sinusoidal. The primary objects of the present invention are: to utilize a sensing assembly of at least two sensing components of the foregoing type at different angular positions with respect to at least one code track in order to produce an association of at least two wave forms that are displaced in phase from each other for analysis by a vector analyzing component capable of subdividing the smallest increments of the code track; to associate such a sensing assembly with other sensing assemblies in order to produce a plurality of signals that directly represent angular position; to provide logic circuitry capable of directly indicating angular position in response to such signals; to provide a direct reading encoder of the foregoing type characterized by particular code track relationships that produce a binary coded decimal output; and to provide a direct reading encoder of the foregoing type characterized by particular code track relationships that produce a direct decimal output.

Other objects of the present invention will in part be obvious and will in part appear hereinafter.

For a fuller understanding of the nature and objects of the present invention, reference should be had to the following detailed description taken in connection with the accompanying drawing, wherein.

Figure 2:
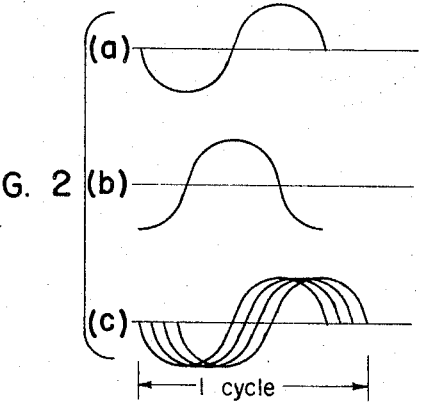
Figure 3:
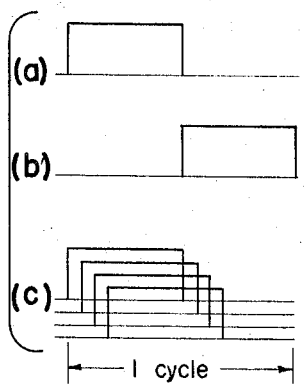
Figure 4:
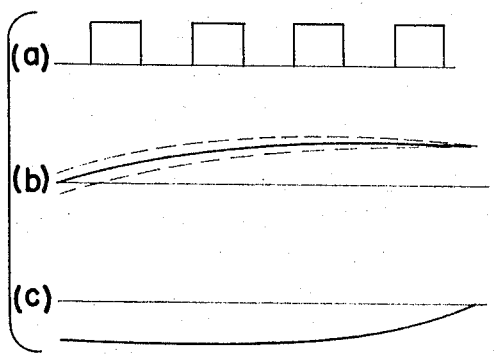

FIGS. 2, 3 and 4 graphically illustrate certain principles of the present invention.

Figure 1:
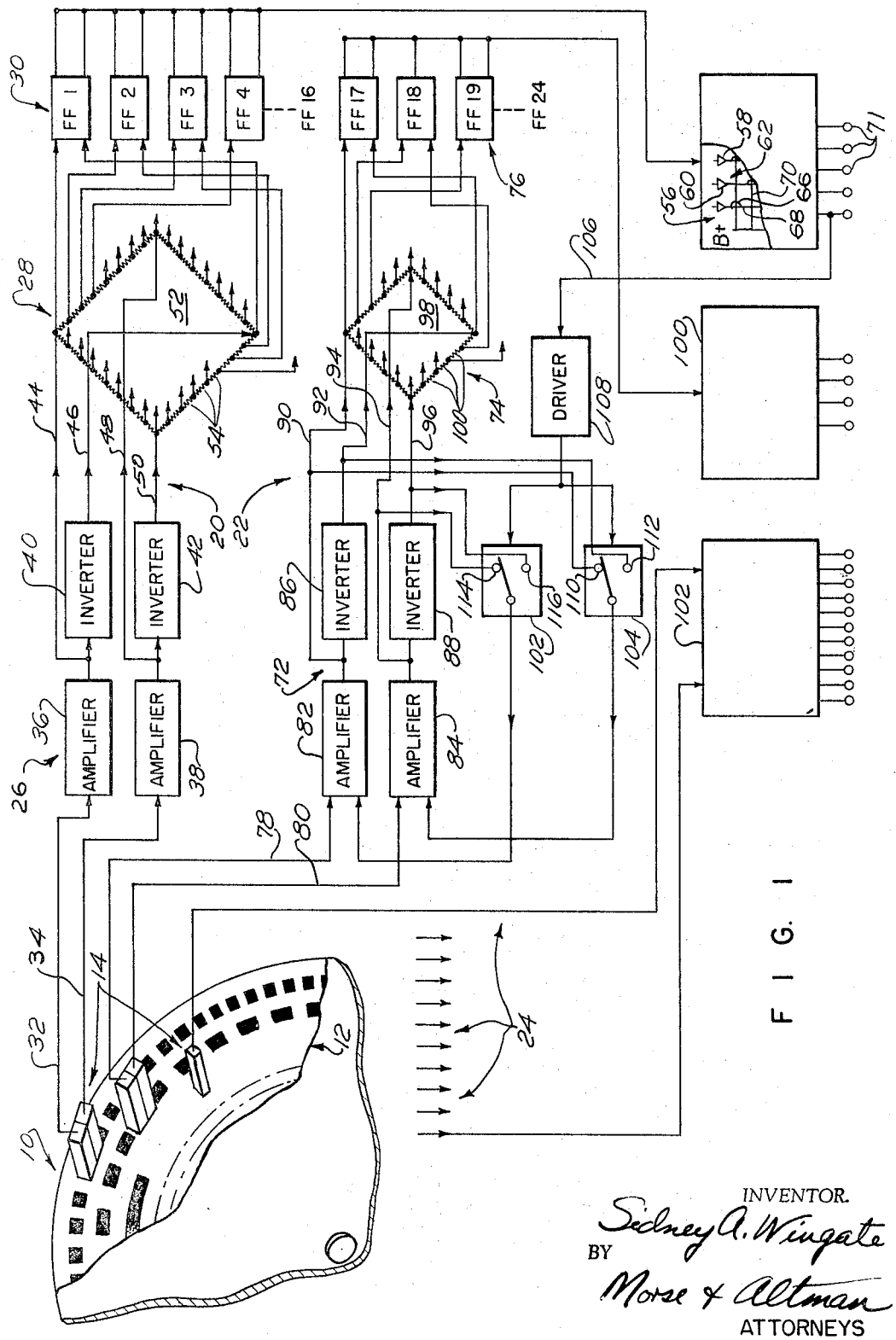
FIG. 1 is a diagrammatic view, partly in mechanical perspective and partly in electrical schematic, of a shaft angle encoding system embodying the present invention.
Figure 1A:
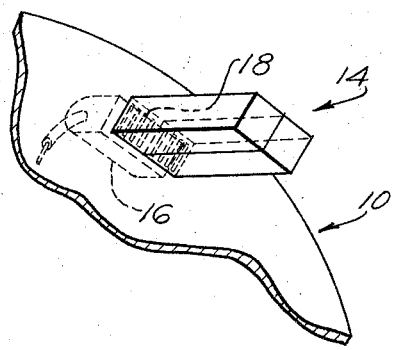
FIG. 1a is a perspective view of certain details of the system of FIG. 1.

The illustrated embodiment of the present invention comprises, as an encoder for association with the output shaft of an instrument or the like, a disk 10 presenting a plurality of concentric code tracks 12 of alternate opaque and clear increments, particular arrangements of photocells 14 in registration with the code tracks, and suitable sources 16 (FIG. 1a) of illumination for the code tracks. Ordinarily, the disk is composed of glass and the track is provided by silver halide photography in terms of silvered and clear regions of a gelatine stratum. Details of such an encoder are described, for example, in U.S. patent application Ser. No. 168,473, filed Jan. 25, 1962 in the name of Sidney A. Wingate for Shaft Encoder, now Patent No. 3,187,187. As shown in FIG. 1a, a pair of photocells 14 are spaced along the first or outermost code track of disk 10 from each other by 90° in terms of a single opaque increment, clear increment cycle. Each of these photocells receive illumination through a series of slits 18 which present a sequence of blocking and transmitting increments of substantially the same dimensions as the opaque and clear increments of the code track for the purpose of transmitting optimum light flux while maintaining maximum optical resolution. Photocells 14 produce a pair of analog position signals of the form $E=E_m \sin 2\pi n\theta$ and $E=E_m \cos 2\pi n\theta$, where E is instantaneous amplitude, $E_m$ is maximum amplitude, $1/n$ is period duration and $\theta$ is instantaneous angular displacement. For purposes to be explained in detail below, in the illustrated embodiment, the photocell arrangement of the second or next-outermost track is similar to that of the first track and the photocell arrangement of the remaining tracks incorporates a single photocell for a single code track. The photocell arrangement associated with any single code track applies its output essentially through a single channel to provide, in combination with outputs of the remaining photocells through other channels, a composite representation of angular position of disk 10. The channel for the first code track is designated 20, for the second code track 22 and for the remaining code tracks 24.

Channel 20 for the first code track generally includes a transfer component 26 for presenting the sinusoidal signals to the remainder of the channel in useful form, a vector distinguishing component 28 for evaluating certain relationships characterizing these sinusoidal signals, and a flip-flop arrangement 30 for digitizing signals representing these relationships. The 90° out-of-phase sinusoidal wave forms generated at 32, 34, shown in FIGS. 2a and 2b, are applied to a pair of amplifiers 36, 38. The output of amplifier 36 is applied to an inverter 40 and the output of amplifier 38 is applied to an inverter 42. The consequent four quadrature signals, as at 44, 46, 48, 50, are applied to the four corners of a bridge network 52 of resistors 54. By utilizing a sequence of oppositely positioned taps of bridge network 52, sixteen pairs of taps in the illustrated case, thirty-two sinusoidal signals, 360°/32=11.25° out-of-phase from wave form to wave form as in FIG. 2c, are produced. Each of the sixteen pairs of signals is applied to a direct current flip-flop of flip-flop arrangement 30, which consists of sixteen such flip-flops, shown in the drawing as FF1 to FF16. The outputs of these flip-flops are utilized by a conventional matrix 56 to produce an indication of five digits, the least significant in this system, in the following manner. Flip-flops FF1 to FF16 operate through driving amplifiers 58, 60 (which may be omitted optionally) to a diode matrix 62. Each of the input lines from the driving amplifiers represent the "0" and "1" states and are selectively connected to a five-digit output through diodes 66 (which are indicated by the small D-shaped symbols). The input lines, two per flip-flop, are designated 68 and the output lines 70. In conventional fashion, when all of the input lines 68 associated with a given output line are energized, the associated indicator 71 is energized.

In considering the information provided by the first track, it is apparent that although a particular portion of a single incremental cycle (a single adjacent opaque increment, clear increment pair) is designated, the identity of no particular one of the multiplicity of incremental cycles in the first code track is designated. Assuming as in the present case a twenty digit output, having established the least five significant digits as above, it would be possible to utilize fifteen additional tracks in natural binary code. However, it is a property of natural binary code that whenever a change in a more significant digit occurs, it is accompanied by a change in a less significant digit. Stated generally, when several digital indications are designed to change at any given time in logic circuitry, accurate operation of this circuitry requires that they do change at that given time or that some compensatory or carry-over logic circuitry be provided to obviate any unintended change. In other words, as will be discussed below in detail, since it is impossible to provide code tracks in which, as a practical matter, exact coincidence of leading and lagging edges exists, appropriate carry-over logic circuitry is required.

In the illustrated system, several of the aforementioned possible fifteen auxiliary code tracks are eliminated by the inclusion of a second code track similar to though coarser than the first track. Specifically, the increments of the second track are sixteen times as large as the increments on the first track. Also, carry-over logic circuitry is provided.

Channel 22 for the second code track generally includes a transfer component 72 for presenting the sinusoidal signals from the second track to the remainder of the channel in useful form, a vector distinguishing component 74 for evaulating certain relationships characterizing these sinusoidal signals, and a flip-flop arrangement 76 for digitizing signals representing these relationships. The 90° out-of-phase sinusoidal wave forms generated at 78, 80, analogous to the wave forms at 32, 34 are applied to a pair of amplifiers 82, 84. The output of amplifier 82 is applied to an inverter 86 and the output of amplifier 84 is applied to an inverter 88. The consequent four quadrature signals, as at 90, 92, 94, 96, are applied to the four corners of a bridge network 98 of resistors 100. By utilizing a sequence of oppositely positioned taps of bridge network 98, eight pairs of taps in the illustrated case, sixteen sinusoidal signals, 360°/16=22.50° out-of-phase from wave form to wave form, are produced. Each of the eight pairs of signals is applied to a direct current flip-flop of flip-flop arrangement 76, which consists of eight such flip-flops, shown in the drawing as FF17 to FF24. The outputs of these flip-flops are utilized by a conventional matrix 100, analogous to matrix 56, to produce an indication of four digits, of next greater significance relative to the five digits produced by channel 20.

The carry-over logic circuitry of the illustrated system, generally designated by 101, operates to guarantee that a transition in the signal from the second track occurs simultaneously with a corresponding transition in the first track. Electronically, this guarantee is effected by adding or subtracting small signal increments to the signal outputs associated with the second track at the command of the output associated with the first track. Specifically, with respect to theoretically aligned edges of increments of the first and second tracks, an indication of the increment of the first track is combined with an indication of the increment of the second track to ensure that no indicated change in the second track can occur in the absence of an indicated change in the first track. This carry-over logic circuitry includes a pair of ganged transistor switches 102, 104 which are controlled by an output 106 from logic circuitry 56 through a driving amplifier 108. It will be observed that the sinusoidal outputs of amplifier 82 and inverter 86 are fed to input terminals 110, 112 of switch 102 and that the sinusoidal outputs of amplifier 84 and inverter 88 are fed to input terminals 114, 116 of switch 102. The output of switch 102 is fed to amplifier 82 and the output of switch 104 is fed to amplifier 84. Thus, when the specified output from the first track is "1," a small fraction of the cos output of the second track is added to the sin input of the second track and a small fraction of the sin output of the second track is subtracted from the cosine input of the second track to develop a slightly lagging composite output. The transition of this composite output is guaranteed not to come before the corresponding transition of the first track. When the specified output from the first track goes from "1" to "0," a small fraction of the sin output of the second track is added to the cos input of the second track and a small fraction of the cos output is subtracted from the sin input of the second track to develop a slightly leading composite input. The transition of the composite output is guaranteed not to come after the corresponding transition of the first track. Thus at the instant of the "1" to "0" transition of the first track, the corresponding transition of the second track output occurs.

The remaining code tracks of the illustrated system are eleven in number, being associated with a suitable output 102. Each track is associated with a single photocell and slit arrangement, corresponding to one-half of the unit shown in FIG. 1a. At any particular shaft angle, each produces a "0" or "1" natural binary output. Thus, the code disk 10 of the encoder of FIG. 1 includes 13 tracks of alternate opaque and clear increments, one pair of opaque and clear increments on any track constituting an incremental cycle in that track. The inner eleven or third to thirteenth code tracks are such that, in the case of each adjacent pair of code tracks, the outer code track has twice as many incremental cycles as the inner code track and a transition (from clear to opaque increment or vice versa) in an inner code track necessarily is accompanied by a transition in the outer code track. However the outermost track may have a number of cycles that is $2^n$ times the number of cycles in the next to outermost track. The arrangement is such that any transition on any inner track is made to be coincident with a corresponding transition in the outermost code track. Also, the number of cycles in the next-outermost or second code track is one-half (or some other arbitrary fraction) the number of cycles of the first code track. Generally, the number of cycles in the first track, for a natural binary output of the foregoing kind, is $2^n$, a practical number being $2^{15}$ for a code disk of from 5 to 10 inches in diameter.

In an alternative embodiment of the present invention, the number of cycles of the first code track is $360 \times 10^n$, a typical number being $360 \times 10^2 = 36,000$ for a code disk of from 5 to 10 inches in diameter. Here the vector analyzing component divides each cycle into 10 parts so that the total count in one revolution is 360,000. Accordingly, one cycle represents $0.001° = 3.6$ seconds of arc. Suitable output circuitry here conveniently provides either natural decimal or binary coded decimal output. Ordinarily, the flip-flop arrangement includes five flip-flops. The remainder of the code tracks include a second incremental track having one-tenth the number of cycles of the first track representing 0.010 increments, a third track having one-hundredth the number of cycles of the first track, representing 0.1° increments, four binary coded decimal tracks (with suitable carryover logic) representing 1.0° increments, four binary coded decimal tracks (with suitable carry-over logic) representing 10.0° increments and two natural binary tracks (with suitable carry-over logic) representing 100.0° increments. Because the 1.0°, 10.0° and 100.0° tracks as a rule, are too coarse to generate satisfactory sinusoidal signals, they are replaced by the binary coded decimal tracks, the outputs of which are converted to natural decimal conveniently. The circuitry for the first, second and third incremental tracks, as suggested above, is analogous to the circuitry of FIG. 1.

The present invention provides several advantages of which the following are among the most significant. The accuracy of the readout in accordance with the present invention depends only on the outer track so that corresponding accuracy of the other tracks is not required unlike the case of prior Gray conventional multi-track code disks. Also because the accuracy depends only on the outer track, station averaging (by which a number of stations at different positions on a single track produce signals to be averaged to compensate for bearing motion and imperfections of the disk) is feasible. Also slit averaging or multiple slits at each station (by which greater amounts of light are available) is feasible, as indicated in FIG. 1a.

The present invention thus provides a novel direct reading disk encoder of unprecedented accuracy, versatility and efficacy. Since certain changes may be made in the foregoing invention without departing from the scope of the invention herein involved, it is intended that all matter contained in the foregoing description or shown in the accompanying drawings shall be interpreted in an illustrative and not in a limiting sense.

What is claimed is:

1. An encoding system comprising code means presenting a plurality of track means, an array of groups of photocell means, said code means and said array being constrained for relative movement with said plurality of track means and said plurality of photocell means in registration, said photocell means of each group being related to each other predeterminedly, illumination means for directing radiation to said plurality of track means, each of said plurality of track means having first regions and second regions for differently associating said radiation with photocell means registered therewith, said groups of photocell means generating groups of predeterminedly different signals representing relative positions of said code means and said array, each of said predeterminedly different signals being characterized by phase differences, first analyzing means for distinguishing among the predeterminedly different signals within a selected group to produce resolved signals representing components of said different signals within said selected group, each of said resolved signals being characterized by phase differences, said phase differences of said resolved signals being greater in number than said phase differences of said predeterminedly different signals, digitizing means responsive to said resolved signals for converting said resolved signals to digital signals, other means for distinguishing among others of said predeterminedly different signals of said plurality of groups to produce other signals, and interrelating means for combining said digital signals and said other signals for presentation.

2. The encoding system of claim 1 wherein said different signals of said selected group are out-of-phase sinusoids.

3. The encoding system of claim 2 wherein the resolved signals of said selected group are of a given number and said digital means includes one-half said given number of flip-flops.

4. The encoding system of claim 1 wherein the resolved signals are of a number corresponding to divisions of a single incremental cycle of one of said track means and said presentation is natural binary.

5. The encoding system of claim 1 wherein the resolved signals are of a number corresponding to ten times the number of increments of one of said track means and said presentation is decimal.

6. The encoding system of claim 1 wherein the resolved signals are of a number corresponding to ten times the number of increments of one of said track means and said presentation is binary coded decimal.

7. The encoding system of claim 1 wherein a carryover circuit ensures that transitions in signals of said selected group occur simultaneously with transitions of corresponding signals of said plurality of groups, said carryover circuit being responsive to said signals from said selected group.

8. A shaft angle encoding system comprising a code disk mounted for rotation on said shaft, said code disk presenting a plurality of tracks concentric about said shaft, a first pair of photocells in registration with a first track of said plurality of tracks, said first pair of photocells being spaced from each other predeterminedly, illumination means for directing radiation to said code disk, said first track having first regions for directing radiation to said first pair of photocells and second regions for obscuring radiation from said first pair of photocells, said first regions and said second regions of said first track being alternate in sequence, an adjacent pair of one of said first regions of said first track and one of said second regions of said first track constituting a single cycle of said first track, a second pair of photocells in registration with a second track of said plurality of tracks, said second pair of photocells being spaced from each other predeterminedly, said second track having first regions for directing radiation to said second pair of photocells and second regions for obscuring radiation from said second pair of photocells, said first regions and said second regions of said second track being alternate in sequence, an adjacent pair of one of said first regions of said second track and one of said second regions of said second track, a plurality of additional photocells in proper registration with remaining tracks of said code disk, said first pair of photocells generating a first pair of sinusoidal signals, a first pair of amplifiers for amplifying said first pair of signals, a first pair of inverters for producing a first pair of inverted signals in response to a first pair of amplified signals for said first pair of amplifiers, a first bridge having a number of impedances separated from each other by taps in sequence along lengths thereof, said first pair of amplified signals being applied to a first pair of spaced taps of said first bridge, said first pair of inverted signals being applied to a second pair of spaced taps of said first bridge, an increased number of pairs of signals appearing at said taps of said first bridge, said second pair of photocells generating a second pair of sinusoidal signals, a second pair of amplifiers for amplifying said first pair of signals, a second pair of inverters for producing a second pair of inverted signals in response to a second pair of amplified signals from said second pair of amplifiers, a second bridge having a number of impedances separated from each other by taps in sequence along lengths thereof, said second pair of amplified signals being applied to a first pair of spaced taps of said second bridge, said second pair of inverted signals being applied to a second pair of spaced taps of said second bridge, an increased number of pairs of signals appearing at said taps of said second bridge, a plural number of first flip-flops for receiving said increased number of pairs of signals at said taps of said first bridge, a plural number of second flip-flops for receiving said increased number of pairs of signals at said taps of said second bridge, a plural number of additional flip-flops operatively responsive to signals from said additional photocells, said first flip-flops providing together a coded indication of said angle.

9. The encoding system of claim 8 wherein said increased number of pairs of signals at said taps of said second bridge is less than said increased number of pairs of signals at said taps of said first bridge.

10. The encoding system of claim 8 wherein a carryover circuit ensures that transitions in said first pair of signals do not occur inconsistently with respect to transitions in said second pair of signals.

11. The encoding system of claim 8 wherein said increased number of pairs of signals at said taps of said first bridge is five.

12. The encoding system of claim 8 wherein said increased number of pairs of signals at said taps of said first bridge is a multiple of two.

13. The encoding system of claim 8 wherein said coded indication is natural binary.

14. The encoding system of claim 8 wherein said coded indication is natural decimal.

15. The encoding system of claim 8 wherein said coded indication is binary coded decimal.

16. A shaft angle encoding system comprising a code disk mounted for rotation on said shaft, said code disk presenting a plurality of tracks concentric about said shaft, a first pair of photocells in registration with a first track of said plurality of tracks, said first pair of photocells being spaced from each other predeterminedly, illumination means for directing radiation to said code disk, said first track having first regions for directing radiation to said first pair of photocells and second regions for obscuring radiation from said first pair of photocells, said first regions and said second regions of said first track being alternate in sequence, an adjacent pair of one of said first regions of said first track and one of said second regions of said first track constituting a single cycle of said first track, a plurality of additional photocells in proper registration with remaining tracks of said code disk, said first pair of photocells generating a first pair of cyclic signals, a first pair of amplifiers for amplifying said first pair of cyclic signals, a first dividing circuit having a number of impedances separated from each other by taps in sequence along lengths thereof, said first pair of cyclic signals when amplified being applied to said dividing circuit, an increased number of signals appearing at said taps of said dividing circuit, a plural number of first flip-flops for receiving said increased number of signals at said taps of said dividing circuit a plural number of additional flip-flops operatively responsive to signals from said additional photocells, said first and said additional flip-flops providing together a coded indication of said angle.

17. The encoding system of claim 16 wherein a carry-over circuit ensures that transitions in said first pair of signals do not occur inconsistently with respect to transitions in said second pair of signals, said carry-over circuit being repsonsive to the output of said flip-flops.

18. A shaft angle encoding system comprising a code disk mounted for rotation on said shaft, said code disk presenting a plurality of tracks concentric about said shaft, a first pair of photocells in registration with a first track of said plurality of tracks, said first pair of photocells being spaced from each other predeterminedly, illumination means for directing radiation to said code disk, said first track having first regions for directing radiation to said first pair of photocells and second regions for obscuring radiation from said first pair of photocells, said first regions and said second regions of said first track being alternate in sequence, an adjacent pair of one of said first regions of said first track and one of said second regions of said first track constituting a single cycle of said first track, a plurality of additional photocells in proper registration with remaining tracks of said code disk, said first pair of photocells generating a first pair of substantially sinusoidal signals, a first pair of amplifiers for amplifying said first pair of signals, a first pair of inverters for producing a first pair of inverted signals in response to a first pair of amplified signals for said first pair of amplifiers, a dividing network having a number of impedances separated from each other by taps in sequence, said first pair of amplified signals and said first pair of inverted signals being applied to said dividing network, an increased number of signals appearing at said taps of said dividing network, a plural number of first flip-flops for receiving said increased number of signals at said taps of said first dividing network, a plural number of additional flip-flops operatively responsive to signals from said additional photocells, said first flip-flops providing together a coded indication of said angle.

19. A shaft angle encoding system comprising code means presenting first track means and additional track means, illumination means for directing radiation to said first track means, two photocell means directed respectively toward two spaced positions of said first track means, said first track means having first regions for directing radiation to said photocell means and second regions for obscuring radiation from said photocell means, said first regions and said second regions being alternately sequenced, adjoining ones of said first regions and said second regions constituting analogous cycles, said first track means and said two photocell means being constrained for relative motion into a sequence of relative analog positions, said spaced positions of said first track means being 90° out-of-phase in terms of said cycles so that said two photocell means produce two signals of differing phase for each of said sequence of relative analog positions, a phase dividing circuit having a sequence of impedances, a plurality of taps between adjacent impedances of said sequence, said two signals being applied to said phase dividing circuit in order to generate a plurality of signals of differing phase at said taps, phase responsive means for producing digital signals representing said signals of differing phase, digital output means responsive to said plurality of signals of differing phase for generating indications of said relative analog positions, said digital output means including a logic matrix for combining said plurality of signals, illumination means for directing radiation to said additional track means, additional photocell means directed toward said additional track means in order to generate additional signals in response to said radiation therefrom, said additional signals constituting indications of said relative analog positions, and means for combining all said indications of said relative analog positions.

20. The encoding system of claim 19 wherein a carry-over logic circuit ensures that transitions in said first pair of signals do not occur inconsistently with said additional signals, said carry-over logic circuit being responsive to the output of said last-mentioned means.

References Cited by the Examiner

UNITED STATES PATENTS

| | | | |
|---|---|---|---|
| 2,747,797 | 5/1956 | Beaumont | 250—208 |
| 2,910,684 | 10/1959 | Jones | 250—208 X |
| 2,930,895 | 3/1960 | Kuehne | 250—209 |
| 3,037,077 | 5/1962 | Williams et al. | 250—209 X |
| 3,058,001 | 10/1962 | Dertouzos | 250—208 |
| 3,096,441 | 7/1963 | Burkhardt | 250—209 |

FOREIGN PATENTS 895,626  5/1962  Great Britain.

RALPH G. NILSON, *Primary Examiner.*

E. STRICKLAND, M. ABRAMSON,
*Assistant Examiners.*